(12) United States Patent
Moore et al.

(10) Patent No.: US 7,383,350 B1
(45) Date of Patent: Jun. 3, 2008

(54) USER INPUT BASED ALLOCATION OF BANDWIDTH ON A DATA LINK

(75) Inventors: Victor S. Moore, Boynton Beach, FL (US); Glen R. Walters, Hollywood, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/497,836

(22) Filed: Feb. 3, 2000

(51) Int. Cl.
*G06F 15/16* (2006.01)

(52) U.S. Cl. .................................... 709/233

(58) Field of Classification Search ............... 709/230, 709/231, 232, 233; 725/95, 96, 90, 88, 91
See application file for complete search history.

(56) References Cited

U.S. PATENT DOCUMENTS

| | | | | |
|---|---|---|---|---|
| 5,167,035 A | * | 11/1992 | Mann et al. ................. | 714/4 |
| 5,822,537 A | * | 10/1998 | Katseff et al. .............. | 709/231 |
| 5,875,175 A | * | 2/1999 | Sherer et al. ............... | 370/230 |
| 5,878,228 A | * | 3/1999 | Miller et al. ............... | 709/235 |
| 5,938,731 A | * | 8/1999 | Schreiter .................... | 709/227 |
| 5,938,734 A | * | 8/1999 | Yao et al. ................... | 709/232 |
| 5,991,810 A | * | 11/1999 | Shapiro et al. ............. | 709/229 |
| 6,014,707 A | * | 1/2000 | Miller et al. ............... | 709/232 |
| 6,055,577 A | * | 4/2000 | Lee et al. ................... | 709/233 |
| 6,125,396 A | * | 9/2000 | Lowe ......................... | 709/234 |
| 6,292,834 B1 | * | 9/2001 | Ravi et al. .................. | 709/233 |
| 6,389,469 B1 | * | 5/2002 | Vekslar et al. ............. | 709/226 |
| 6,415,326 B1 | * | 7/2002 | Gupta et al. ................ | 709/231 |
| 6,449,688 B1 | * | 9/2002 | Peters et al. ............... | 711/112 |
| 6,502,139 B1 | * | 12/2002 | Birk et al. .................. | 709/233 |
| 6,546,428 B2 | * | 4/2003 | Baber et al. ................ | 709/232 |
| 6,665,702 B1 | * | 12/2003 | Zisapel et al. ............. | 718/105 |
| 6,751,802 B1 | * | 6/2004 | Huizer et al. .............. | 725/90 |
| 2002/0023164 A1 | * | 2/2002 | Lahr .......................... | 709/231 |
| 2002/0038374 A1 | * | 3/2002 | Gupta et al. ................ | 709/231 |

OTHER PUBLICATIONS

Headlight Software. "GetRight Help Contents", GetRight version 4.1, released Oct. 13, 1999, 67 pages.*
Headlight Software. "GetRight Version History", publicly posted Oct. 13, 1999, 9 pages.*
Headlight Software. "GetRight (by Headlight Software): Download GetRight", publicly posted Oct. 13, 1999, 2 pages.*

* cited by examiner

*Primary Examiner*—George Neurauter
(74) *Attorney, Agent, or Firm*—Jeffrey Giunta; Fleit Kain Gibbons Gutman Bongini & Bianco P.L.

(57) ABSTRACT

In a computer network, user input is used to control the bandwidth used by particular applications. Data is sent from either a data source computer or an intermediate computer (e.g. dial-up server) to a client computer according to the user input. The allocation of bandwidth may be managed from the client computer, data source computer, or intermediate computer. The user may set a limit on the baud rate used by particular applications.

7 Claims, 7 Drawing Sheets

USER INPUT BASED ALLOCATION OF BANDWIDTH ON A DATA LINK

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS-REFERENCE TO RELATED APPLICATIONS

Not Applicable

FIELD OF THE INVENTION

This invention relates to telecommunications, and more particularly this invention pertains to management of available bandwidth on a telecommunications data link.

BACKGROUND OF THE INVENTION

In the telecommunications infrastructure, e.g. in computer networks, different applications often compete for use of data links having limited available bandwidth to transmit multiple data messages to a single receiving computer. Processing power of the receiving computer may also be heavily loaded by the need to process different messages of incoming data. In many networks such as the Internet, the priority in use of the limited bandwidth and/or the limited processing power of the receiving computer is often determined on a first come first serve basis. That is higher speed computers which have a higher speed data path to the computer (e.g. dial up server) which is one data link away from the destination (client) computer, will tend to monopolize the link to the client computer. Consequently, the dominant use of data link bandwidth, and processing power of the client computer, may not conform to the priorities of the client user.

A current example of this problem is the situation for home users of the Internet. It is often the case that an Internet user is interested in conducting multiple downloads at the same time. For example, a user may click a link to download one or more files from a File Transfer Protocol (FTP) site, and then wish to continue browsing the World Wide Web (WWW) using his web browser which requires Hypertext Transfer Protocol (HTTP) downloads. Unfortunately, the FTP requests may use a large fraction of the available bandwidth leaving a small portion available for the HTTP messages, so that consequently, the response time of the user's web browser to navigation inputs is greatly increased. The user may consider the download a low priority, and prefer to have enhanced response time to WWW navigation inputs.

The user may be connected to the Internet by a relatively slow digital modem, or a fast cable modem or fast Digital Subscriber Line (DSL). In any case, the speed of the source computers and the speed of the transmission path between the source computers and the node to which the user's computer is connected (e.g. the Internet Service Provider (ISP) dial-up server) will determine which source computer dominates the use of the final link to the user's computer. Although, all delays are reduced in the case of a fast link, the delay becomes appreciable again, in the case of much larger file transfers, which can be expected to be common place in the near future given the growing interest in multimedia uses of the Internet.

The percentage of the available bandwidth used by two different applications may also be affected by the format of the messages sent. For example, other factors being equal an application which sends large data blocks will use more bandwidth.

In the case of two data messages coming from the same computer there may be a default prioritization which is not to the liking of the user.

For example this can happen to a user who connects to a private network for the purpose of sending or checking email. At login, some systems check various information files on the client computer and if any are found to be outdated, initiates downloading of updated files. This too, can use up a large portion of the available bandwidth, and slow down the response of the system to user initiated requests.

There is a need for a system in which the user can control the bandwidth used by one or more applications, in order to reserve a remainder portion of the bandwidth for use by other applications.

SUMMARY OF THE INVENTION

According to one aspect of the invention, a speed indicator message is received at a server computer from a client computer, and the speed at which a data item is sent from the server to the client is adjusted in accordance with the speed indicator message.

According to another aspect of the invention a client computer controls the rate at which it receives data by issuing a sequence of timed pause and continue signals.

According to another aspect of the invention systems and computer readable media is disclosed for carrying out the above methods.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF AN EMBODIMENT

Figure 1:
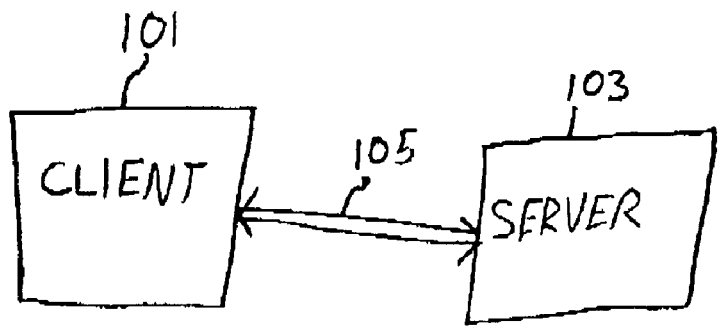
FIG. 1 is a schematic diagram of a client-server computer system according to an embodiment of the present invention.

FIG. 1 shows a client computer 101 and a server computer 103 connected by a bidirectional data link 105. The bidirectional data link may comprise, for example, a modem connection, or other data links known in the art of data communication.

Figure 2:
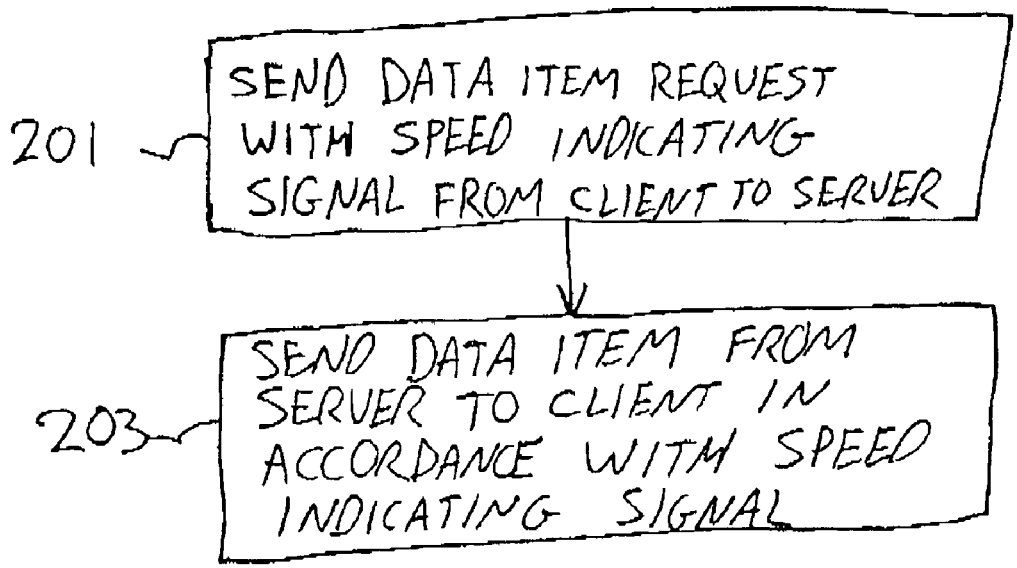
FIG. 2 is a high level flow diagram of the overall process, according to the present invention.

Referring to FIG. 2 a flow diagram of an embodiment of the present invention is shown. In a first step 201, a request for a data item, which, for example, may take the form of a Hypertext Transfer Protocol (HTTP) request, a File Transfer Protocol (FTP) request or another type of request, and a speed indicating signal are transmitted from a client computer to a server computer. The speed indicating signal is used to configure the server computer to transmit the data item specified in the request at a speed derived at least in part from the speed indicating signal. The speed indicating signal may, for example, indicate a maximum data transmission rate. In such a case, the speed used in transmission can be less than the maximum data transmission rate due to other limiting factors such as the rate at which the data can be accessed at the server. In the next process step 203, the requested data item is sent from the server to the client in accordance with the speed indicating signal.

Figure 3:
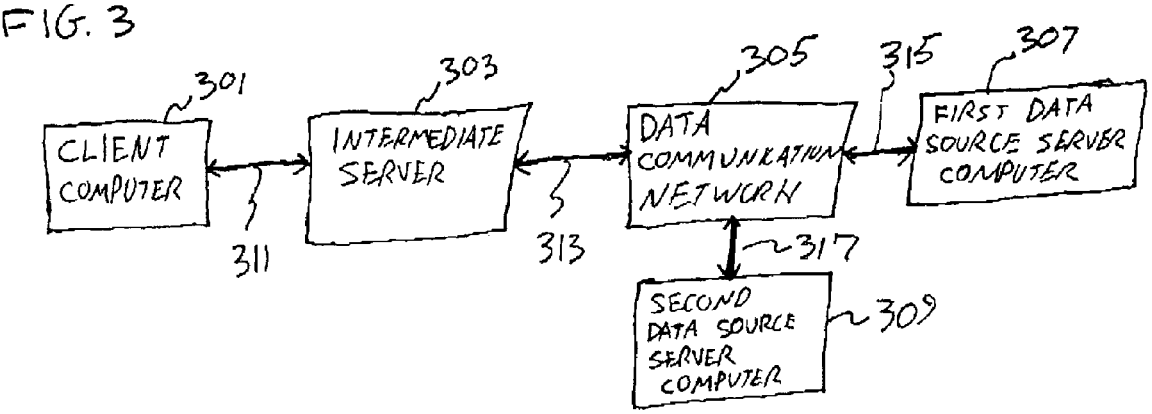
FIG. 3 is a schematic diagram of a client-server computer system according to another embodiment of the invention.

Referring to FIG. 3 a computer system is schematically illustrated. The system comprises a client computer 301, an intermediate server 303 which may be, for example, a proxy server or an dial up server, a data communication network 305 (e.g. Internet, Wide Area Network (WAN), Local Area Network (LAN)) a first data source server 307 and a second data source server 309. The client, and the server computers may comprise for example an IBM compatible PC computer, comprising a microprocessor, hard drive, RAM, BIOS ROM, keyboard, display and mouse. The client 301 is linked to the intermediate server 303 via a first bidirectional data link 311. The intermediate server 303, first data source server, 307 and second data source server 309 are connected to the data communication network 305 through bidirectional data links 313, 315, and 317 respectively. The link to the client might be a dial up modem connection, cable modem connection, of the like. The other links would usually be higher bandwidth connections e.g. T1 or T5 lines.

Figure 4:
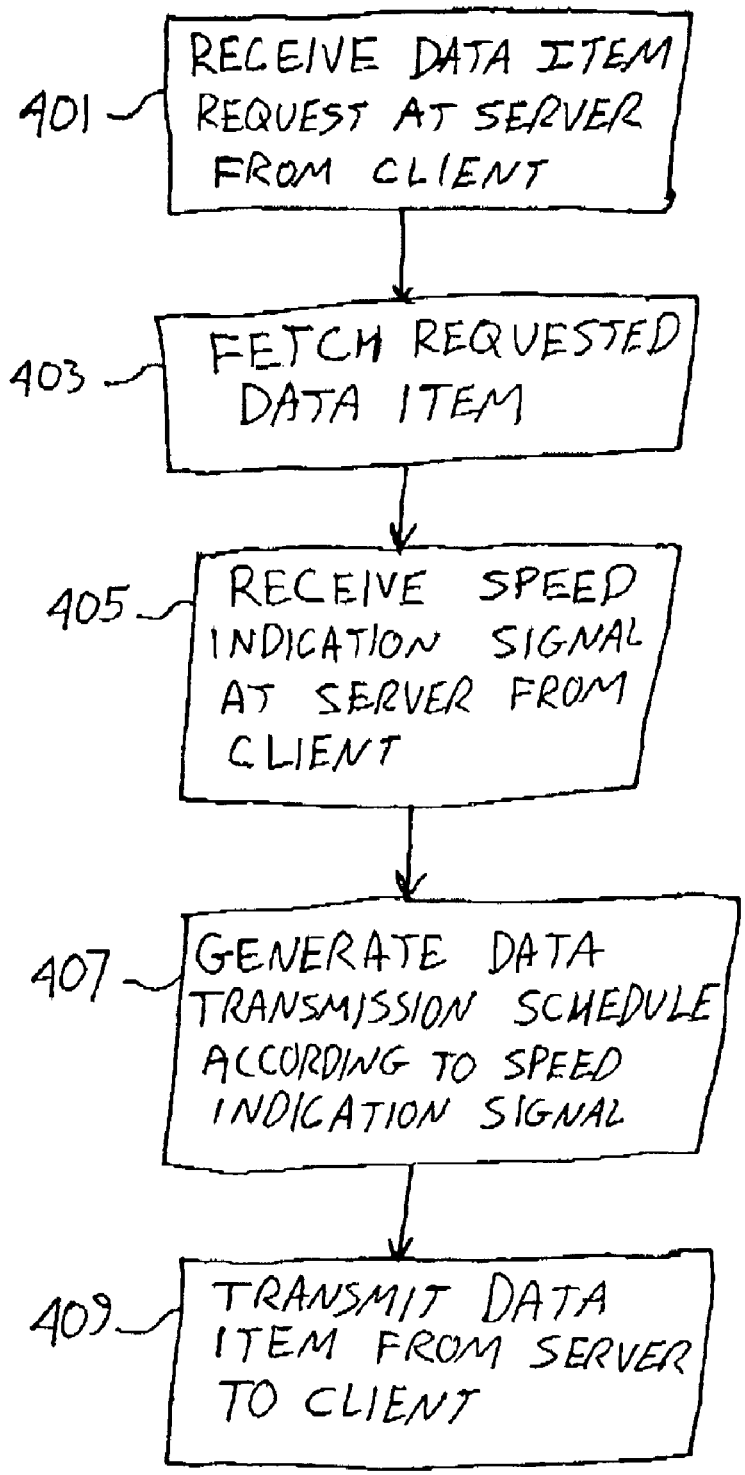
FIG. 4 is a flow diagram of an embodiment of the invention in which the data rate is controlled at a data source computer based on a signal from a client computer, according to the present invention.

Referring to the flow diagram shown in FIG. 4, an embodiment of the invention in which the speed at which data is sent to the client 301 is governed at the data source server 307 will be described. In a first process block 401, a data request and a speed indicating signal are received at the first data source computer 307 from the client computer 301 by way of the intermediate server 303 and the data communication network 305. The data request could be a request for the transfer of a file. The speed indicating signal may be, for example, a maximum data rate. As discussed below, the first data source server 307 will attempt to transmit data at the indicated maximum data rate. The achieved rate could be slower than the maximum if the first data source server 307 is very busy with other tasks, or if there are slow links in the data communication network 305, due to break downs or a high volume of traffic.

In the next process block 403, the data indicated in the data request is fetched from a memory (not shown) associated with the first data source server. In the next process block 405, a speed indication signal is received at the first data source computer 307, from the client computer 301, by way of the intermediate server 303 and the data communication network 305.

In the next process block 407, a transmission schedule based on the maximum indicated speed is determined. According to one mode of operation, the requested data item will be broken into separate blocks which will be sent out at intervals substantially equal to the specified period. The interval could differ from the specified period due to for example, other processes running on the data source computer 307, and tying up resources required to send the data. The size of the block and the period are chosen to give the maximum indicated speed. The transmission speed is then closely related to the block size divided by the period, so that there is a large degree of latitude in choosing either of the two. However, to fulfill the objective of not monopolizing the data link to the client, and the client computer resources, the period is desirably chosen to be small compared to a period noticeable as a delay to a client user e.g. preferably less than 2 or 3 seconds. Obviously the period can not be so small that it is less than the time required to send the block-it must be more. Once the period is chosen, the block size is fully determined by the maximum indicated speed.

In the next process block 409, the transmission schedule is implemented, and the requested item is sent back through the data communication network 305, and intermediate server 303, to the client computer 301, according to the data transmission schedule.

A second data request may then be made from the client computer to the second data source server computer 307, and some portion of the bandwidth of the link 311 between the intermediate server and the client computer, and some portion of the computing resources of the client computer 301, which would otherwise have been used for transmitting and processing the data requested from the first data source server 307 had the rate of the first transmission not been limited, will now be available for transmitting and processing the data received in answer to the second data request.

Referring to the flow diagram shown in FIG. 5, an embodiment of the invention in which the speed at which data is sent to the client 301 is governed by the intermediate server 303 will be described. In the first process block 501, a first data item request referencing by an address included therein the first data source server 307, and a speed indicating signal are sent from the client computer 301 to the intermediate server computer 303.

In the next process block 503, the first data request is forwarded to a first data source server 307. At this stage, if the speed indicating signal were appended to the request, it could be stripped off and stored in a memory (not shown) associated with the intermediate server 303. In the next process block 505 the data indicated in the data request is accessed at the first data source computer 307, transmitted therefrom, and received at the intermediate server 303. The data is then temporarily stored in a second memory (e.g. a buffer, not shown) associated with the intermediate server 303. In the next process block 507 a transmission schedule is established based on the speed indicating signal, in a manner similar to that discussed above in connection with FIG. 4. In the next process block 509, the transmission schedule is implemented, and the data is read from the buffer, and transmitted to the client computer according to the transmission schedule. In the next process block 511, a check is made to determine if a new speed indicating signal has been received from the client 301. If a new speed indicating signal has been received the process loops back to the step of establishing a transmission schedule 507, and continues on the basis of the new speed indication signal. If no new speed indication signal has been received, transmission continues according to the previously received speed indicating signal in block 513. As will be apparent to those skilled in the art, the order of the steps does not have to be that shown in FIG. 5 and described above. For example, the step of establishing a transmission schedule could be conducted concurrently with the step of forwarding the first data request to the first data source computer.

Figure 5:
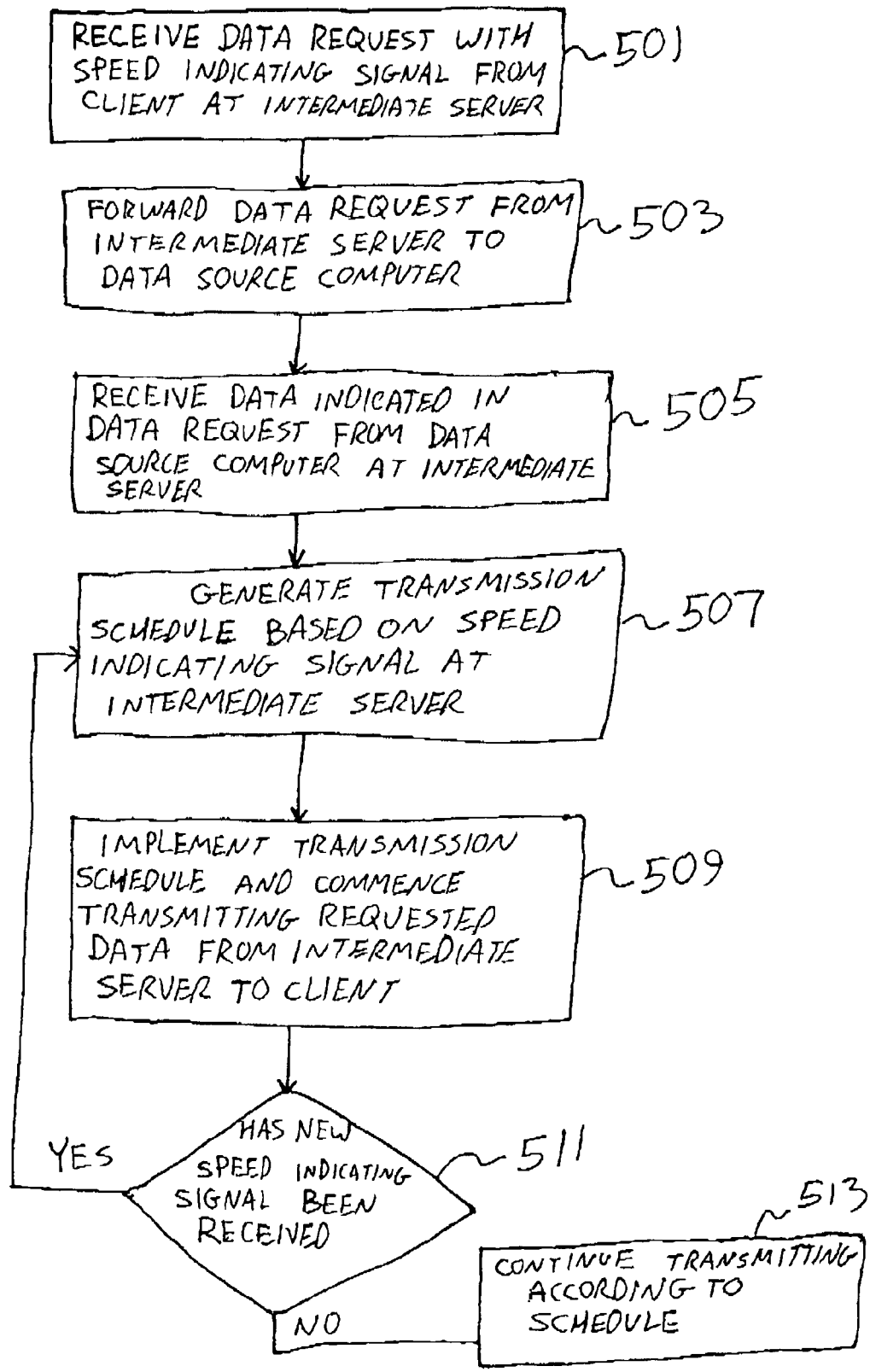
FIG. 5 is a flow diagram from the perspective of an intermediate server of an embodiment in which the data rate is controlled at an intermediate computer based on signals received from a client, according to the present invention.

The method shown in the flow diagram of FIG. 5 has the advantage that the software that implements it, which may for example take the form of modified SOCKS server and client programs with extensions, need only be deployed on the client and intermediate server, not on the many data source servers (e.g. the myriad of computers accessible over the Internet) that may be part of the computer system. This has some commercial advantage. For example, an ISP could offer its user's the bandwidth utilization control functionality provided by the invention by loading the server side implementing software on their servers, and provide the users with client side implementing software, thereby providing an enhanced Internet access service to its users.

Figure 6:
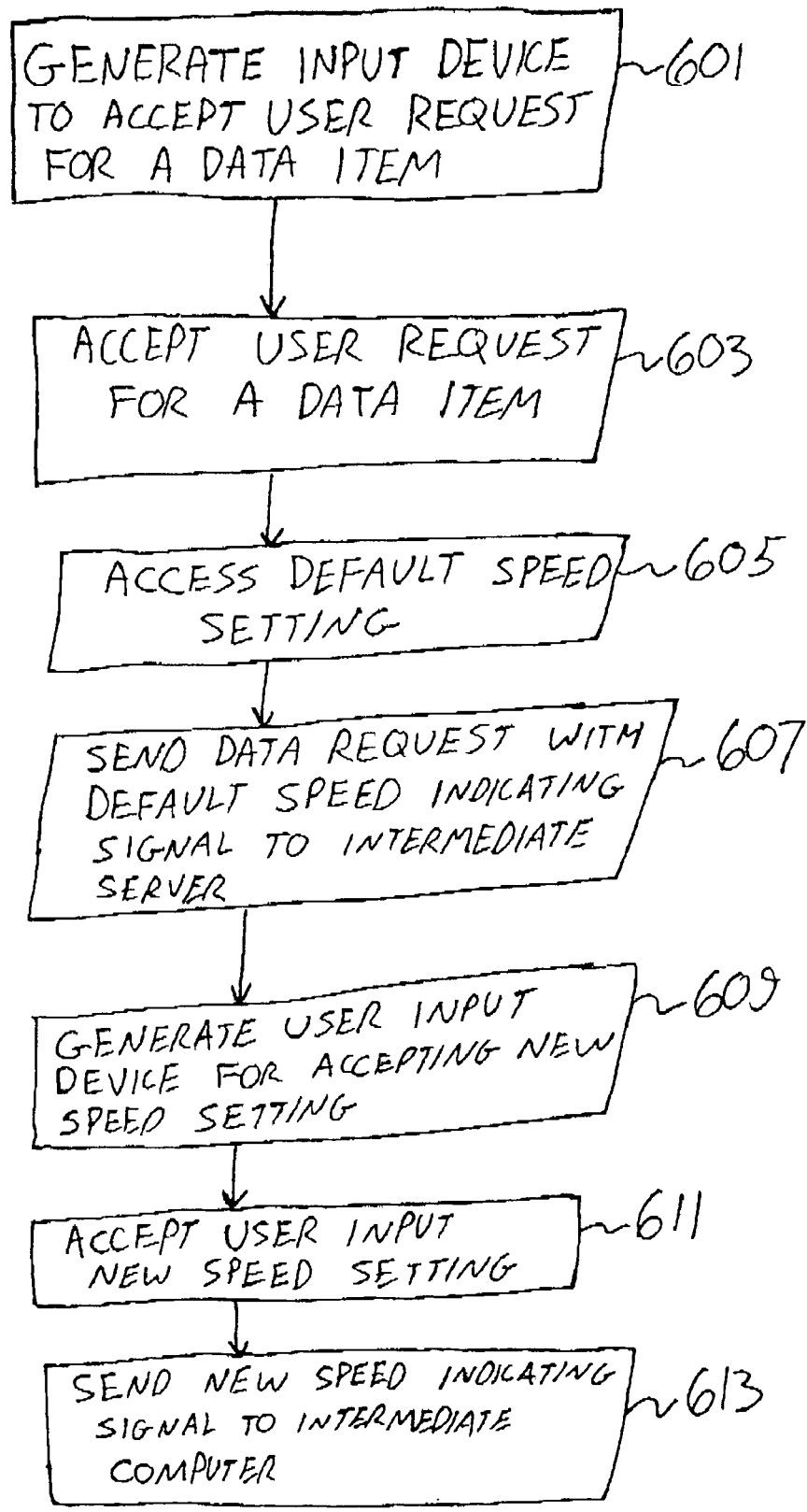
FIG. 6 is a flow diagram from the client perspective of a process used in connection with the process shown in FIG. 5, according to the present invention.
Figure 7:
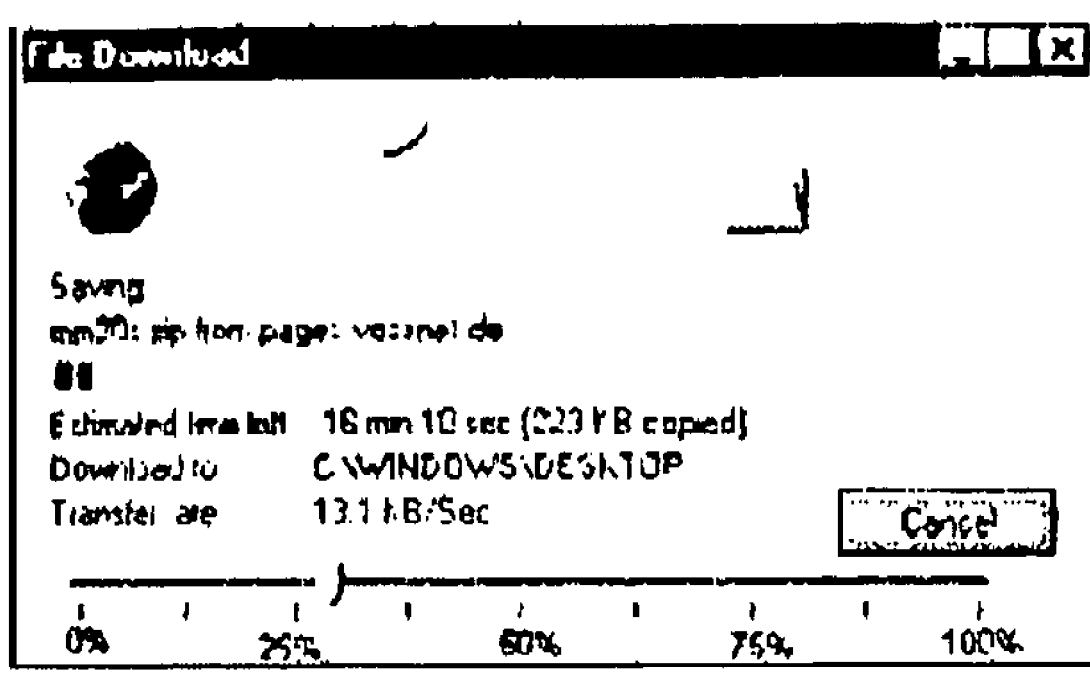
FIG. 7 is a representation of a dialog box used for entering a data transmission speed setting used in the process depicted in FIG. 6, according to the present invention

FIG. 6 is a flow diagram for processes run on the client computer 301, which cooperates with the intermediate server 303 side process illustrated in FIG. 5. Referring to FIG. 6, in the first process block 601 a user interface device for accepting a user's request for a data item is generated. In the next process block 603, the request for the data item is accepted. In the next process block 605, a preset default speed setting is accessed from a memory associated with the client computer. The default speed setting can be stored in a memory associated with the client computer (e.g. hard drive). The default setting could be a changeable setting that could be changed by a user accessing settings for the program embodying the flow diagram. In the next process block 607, the data request along with the default speed setting is sent to the intermediate server 303. In the next process block 609, a second user interface device which allows the user to input a new speed setting is generated. As shown in FIG. 7, the second user interface device could, for example, take the form of a GUI type dialog box having a slider device which the user can drag with a mouse pointer to select a speed setting. In FIG. 7, the scale is marked in percentages, which could be referenced to an expected maximum possible speed for the link which is stored in a client computer memory. The scale could be marked in other ways as well (e.g., directly in Kilobytes per second). The dialog box also displays useful information related to the download: the source domain name, destination path, the current download rate, and the estimated time to completion. The dialog box includes a cancel button for aborting the download. Referring once again to the flow diagram depicted in FIG. 6, in the next process block 611, user input is accepted through the user input device generated in the previous step. In the next process block 613, a new speed indicating signal based on the user input obtained in the previous block is transmitted to the intermediate computer.

Referring to the flow diagram shown in FIG. 8, an embodiment of the invention in which the speed at which data is sent to the client 301 is governed by the client 301 itself will now be described. In a first process block 801, a device (e.g. GUI) is generated to accept a request for a data item from a user. In a second process block 803, the user request for a data item is accepted. In the next process block 805, a device for accepting a data transfer speed setting from the user is generated. This user interface device may take the form of that shown in FIG. 7. Absent, any input from the user, the process proceeds to the next block based on a default setting which may be retrieved from a client computer memory. In the next process block 807, a schedule is generated based on either the default speed setting or a setting input by the user using the device generated in the preceding process block 805. The schedule, is preferably a periodic schedule comprising two intervals in each cycle. At the start of the first interval, a pause transmission signal is sent from the client computer, and at the end of the first interval a continue transmission signal is sent from the client. During a period substantially overlapping the first interval, and slightly delayed with respect to it by the transmit time for the signals, no data will be transmitted to the client. The second interval begins with the continue transmission signal and ends with the pause transmission signal. During a period substantially overlapping the second interval, data will be transmitted to the client. The length of the first and second intervals can be chosen in view of the following equation which approximately relates the speed setting to the data link speed (e.g. modem connection speed) in terms of the lengths of the first and second intervals:

Set Speed=$DLS*SI/(SI+FI)$ where

DLS is the data link speed;

SI is the second interval length; and

FI is the first interval length.

Other considerations also apply to the choice of the intervals. The second interval transmission time should not be so long as to cause a delay for other applications sharing the link that is noticeable to the user (i.e., it should preferably not be more than 5 seconds). On the other hand, in the interest of efficiency, the first and second intervals should not be so short that they are comparable to the overhead time involved in sending the pause and continue signals and carrying out the pause and continue instructions. The total cycle time is preferably at least 1 second.

Figure 8:
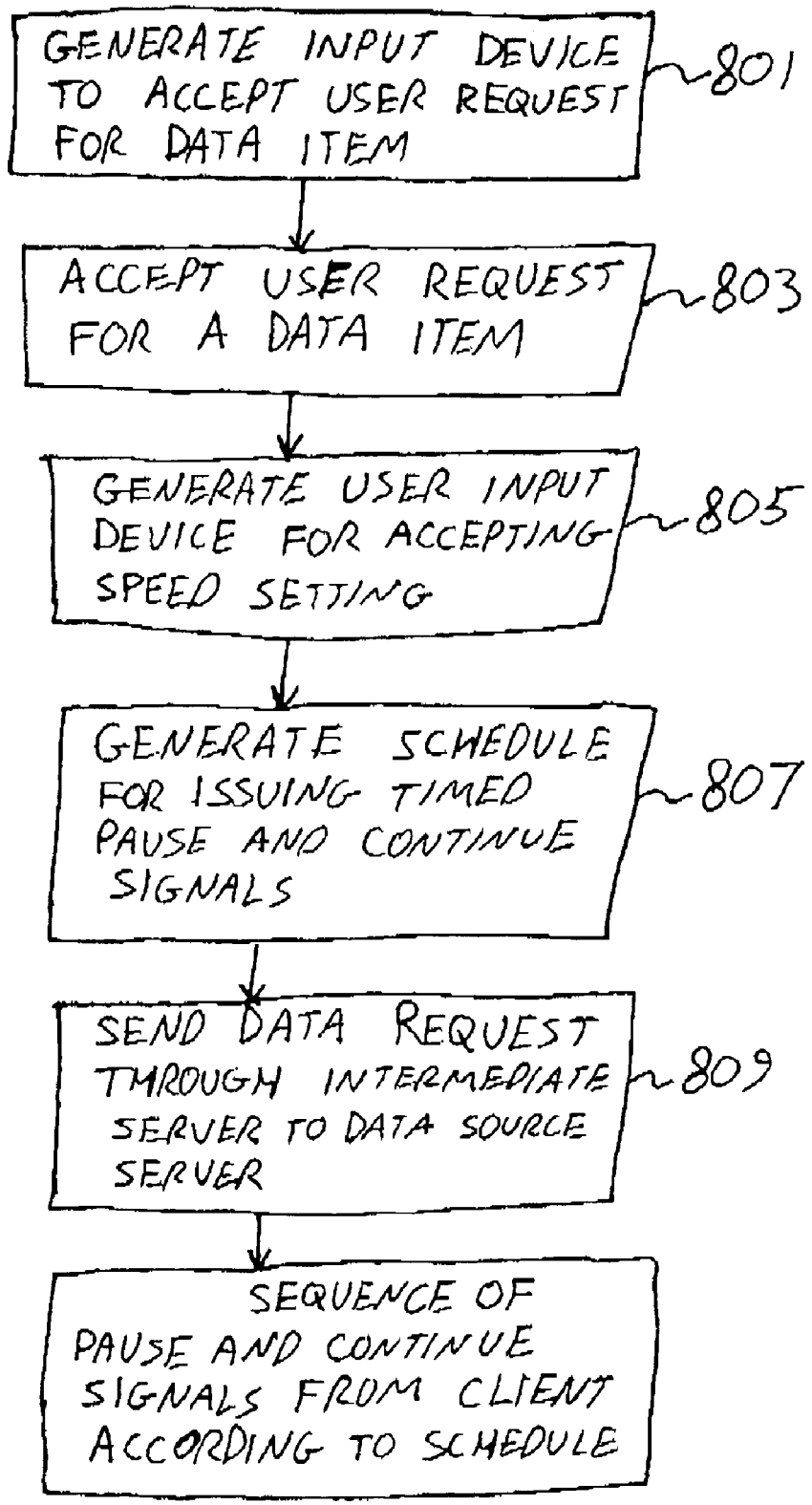
FIG. 8 is a flow diagram from a servers perspective of data flow rate control, managed by a client computer, according to the present invention.

In the next process block 809 in FIG. 8, the data request is sent through the intermediate server to the data source. In the next process block 811, a sequence of pause and continue signals are sent from the client according to the previously determined schedule in order to control the fraction of the data link bandwidth used for the particular data item request. During the first interval, when transmission of the data item is paused other applications may use the data link for transmitting or receiving data. For example, a large file download could be limited to using a fraction of the data link bandwidth, allowing a web browser client to use the remaining part of the available bandwidth.

The pause and continue signals could be directed to the data source server, or to the intermediate server. In the latter case, the data source server will continuously transmit the requested data item to the intermediate server, which will accumulate the data item in a buffer, from which it will be read out during each second (transmit) interval.

Software for implementing the flow diagrams of FIG. 1, FIG. 4, FIG. 5, FIG. 6. and FIG. 8 can be loaded onto the computer on which they are run as indicated above, from some type memory medium (e.g. a floppy disk). The software will then configure the computer to implement the flow diagram.

It should be understood that the embodiments described above are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

What is claimed is:

1. A communication method for limiting transmission rate of data being transmitted from a server to a requesting computer in response to a user's input, said method comprising steps of:

accepting a user request for a specified data item at a requesting computer, the specified data item to be delivered in its entirety prior to being accessed;

accepting, at the requesting computer in response to accepting the user request for the specified data item, a user input speed setting, wherein the user input speed setting is not related to a speed that is associated with the specified data item;

generating, at the requesting computer in response to accepting the user input speed setting, a speed indication signal that comprises a maximum transmission rate to be used in transmitting the specified data item from the server to the requesting computer, wherein the maximum transmission rate is based upon the user input speed setting and is less than the data rate of the data link and less than the data rate capacity of the requesting computer;

receiving, at a server from the requesting computer, a request for the specified data item;

receiving, at the request for the specified data item, the speed indication signal; and transmitting the specified data item from the server to the requesting computer, the transmitting comprising limiting, by the server, an average rate of transmission while sending at least a portion of the specified data item across a data link from the server to the requesting computer to be not greater than the maximum transmission rate represented within the speed indication signal received from the requesting computer.

2. A communication method according to claim 1 in which the transmitting step comprises substeps of:

determining, at the server in response to receiving the speed indication signal, a block size based at least on the speed indication signal;

determining, at the server in response to receiving the speed indication signal, a period based at least on the speed indication signal, wherein the period is longer than the period required to transmit the block size at the data rate of the data link; and transmitting, from the server in response to receiving the speed indication signal, a plurality of blocks of data, each of the blocks having the block size and being transmitted at intervals substantially equal to the period.

3. A communication method according to claim 1, further comprising steps of:

accessing a remote computer indicated in an address included in the request, wherein the remote computer is not one of the server and the requesting computer; and receiving, at the server, the specified data item from the remote computer.

4. A communication method according to claim 1 further comprising steps of reading the specified data item from a memory associated with the server.

5. The method according to claim 1, further comprising:

receiving at the server, from the requesting computer, a new speed indication signal containing a new indicated speed, the new speed indication signal being received subsequently to the receiving the request and during the transmitting the specified data item; and adjusting, in response to receiving the new speed indication signal, the average rate of transmission while continuing the transmitting the specified data item to be not greater than the new indicated speed contained within the new speed indication signal, wherein the new indicated speed is less than the data rate of the data link and less than the data rate capacity of the requesting computer.

6. The method according to claim 3, wherein the server comprises a dial-up server.

7. The method according to claim 1, wherein the speed indication signal is a quantity specifying a maximum data transmission rate corresponding to the user input speed setting.

* * * * *